(12) United States Patent
Schulz et al.

(10) Patent No.: US 7,093,500 B2
(45) Date of Patent: Aug. 22, 2006

(54) TUNABLE EMPTY PIPE FUNCTION

(75) Inventors: Robert K. Schulz, Excelsior, MN (US); Scot R. Foss, Eden Prairie, MN (US); Thomas H. Junkans, Springbrook, WI (US)

(73) Assignee: Rosemount Inc., Eden Prairie, MN (US)

( * ) Notice: Subject to any disclaimer, the term of this patent is extended or adjusted under 35 U.S.C. 154(b) by 23 days.

(21) Appl. No.: 11/009,149

(22) Filed: Dec. 10, 2004

(65) Prior Publication Data

US 2005/0126305 A1    Jun. 16, 2005

Related U.S. Application Data

(60) Provisional application No. 60/529,393, filed on Dec. 12, 2003.

(51) Int. Cl.
*G01F 1/58* (2006.01)

(52) U.S. Cl. .................................. 73/861.15

(58) Field of Classification Search ............. 73/861.17, 73/861.12, 861.18, 861.15, 861.16; 702/49, 702/45; 704/201
See application file for complete search history.

(56) References Cited

U.S. PATENT DOCUMENTS

| | | | | |
|---|---|---|---|---|
| 4,513,624 A | * | 4/1985 | McHale et al. | 73/861.12 |
| 4,676,112 A | * | 6/1987 | Uematsu et al. | 73/861.17 |
| 4,969,363 A | * | 11/1990 | Mochizuki | 73/861.17 |
| 5,301,556 A | * | 4/1994 | Nissen et al. | 73/861.15 |
| 5,327,787 A | * | 7/1994 | Kiene et al. | 73/861.12 |
| 5,426,984 A | * | 6/1995 | Rovner et al. | 73/861.17 |
| 5,691,896 A | | 11/1997 | Zou et al. | 364/157 |
| 5,895,864 A | | 4/1999 | Wang et al. | |
| 6,237,424 B1 | | 5/2001 | Soghomonian et al. | |
| 6,301,556 B1 | * | 10/2001 | Hagen et al. | 704/201 |
| 6,311,136 B1 | | 10/2001 | Henry et al. | 702/45 |
| 6,505,519 B1 | | 1/2003 | Henry et al. | 73/861.356 |
| 6,507,791 B1 | | 1/2003 | Henry et al. | 702/45 |
| 6,611,770 B1 | | 8/2003 | O'Donnell et al. | 702/49 |
| 6,711,958 B1 | | 3/2004 | Bitto et al. | 73/861.355 |

(Continued)

FOREIGN PATENT DOCUMENTS

DE    3810034    10/1989

(Continued)

OTHER PUBLICATIONS

R. Gao et al.; "Magnetic Flowmeter Meural-Wavelet Diagnostics System," 1999 International Conference on Information Intelligence Systems; Oct. 31, 1999-Nov. 3, 1999, Bethesda, MD. pp. 149-154.

(Continued)

*Primary Examiner*—Jewel V. Thompson
(74) *Attorney, Agent, or Firm*—Westman, Champlin & Kelly, P.A.

(57) ABSTRACT

An electromagnetic flowmeter for measuring a flow rate of a fluid in a pipe is described. A pipe carries a fluid. A magnetic coil is disposed adjacent to the pipe for inducing a magnetic flux in the fluid. A plurality of electrodes are disposed within the pipe, and the plurality of electrodes are electrically isolated from one another. Measurement circuitry is coupled to at least one of the plurality of electrodes and is configured to measure flow rate as a function of a potential across the plurality of electrodes. An empty pipe detector is coupled to at least one of the plurality of electrodes and is adapted to detect an empty pipe condition based upon an adjustable test criteria. In one embodiment, a local operator interface is coupled to the empty pipe detector for adjusting the adjustable test criteria.

46 Claims, 8 Drawing Sheets

U.S. PATENT DOCUMENTS

| | | | |
|---|---|---|---|
| 6,732,275 B1 | 5/2004 | Dimenstein | 713/193 |
| 2002/0019710 A1 | 2/2002 | Henry et al. | 702/45 |
| 2002/0038186 A1 | 3/2002 | Henry et al. | 702/45 |
| 2003/0011386 A1 | 1/2003 | Xie et al. | 324/694 |
| 2003/0051557 A1 | 3/2003 | Ishikawa et al. | 73/861.12 |
| 2003/0056602 A1 | 3/2003 | Cushing | 73/861.17 |
| 2003/0154804 A1 | 8/2003 | Henry et al. | 73/861.356 |
| 2004/0031328 A1 | 2/2004 | Henry et al. | 73/861.18 |

FOREIGN PATENT DOCUMENTS

| | | |
|---|---|---|
| JP | 03 257327 | 11/1991 |

OTHER PUBLICATIONS

Michalski, A.; "New Approach to a Main Error Estimation for Primary Transducer of Electromagnetic Flow Meter," IEEE Instrumentation and Measurement Technology Conference, St. Paul MN, May 18-21, 1998, pp. 1093-1097.

Andrzej Michalski et al.; "Optimal Design of the Coils of an Electromagnetic Flow Meter," *IEEE Transactions on Magnetics*, vol. 34, No. 5, Sep. 1998, pp. 2563-2566.

Taiichi Teshima et al.; "Electromagnetic Flowmeter with Multiple Poles and Electrodes," IEEE Transactions 1994, pp. 1221-1224.

Andrzej Michalski et al.; "Eliminating Short Ending Effects in the Primary Transducer of Electromagnetic Flow Meters," *IEEE Transactions on Magnetics*, vol. 39, No. 2, Mar. 2003, pp. 1035-1039.

F. Yates Sorrell et al.; "An Electromagnetic Current Meter-Based System for Application in Unsteady Flows," *IEEE Journal of Oceanic Engineering*, vol. 15, No. 4, Oct. 1990. pp. 373-379.

Appell, G.; "A Review of the Performance of An Acoustic Current Meter," Working Conference on Current Measurements, Jan. 1989, pp. 35-58.

Bevir, M.K.; "Theory of Induced Voltage Electromagnetic Flowmeasurement," *IEEE Transactions on Magnetics*, vol. Mag-6, No. 2, Jun. 1970. pp. 315-320.

A. Michalski et al.; "A Novel Approach to Eliminating Short Ending Effects in the Primary Transducer of Electromagnetic Flow Meter," *IEEE Transactions*, 2000, pp. 269-272.

Nicolae Calin Popa et al.; "Magnetic Fluid Flow Meter for Gases," *IEEE Transactions on Magnetics*, vol. 30, No. 2, Mar. 1994, pp. 936-938.

\* cited by examiner

TUNABLE EMPTY PIPE FUNCTION

CROSS-REFERENCE TO RELATED APPLICATION(S)

The present invention claims priority from provisional patent Application Ser. No. 60/529,393 filed Dec. 12, 2003, and entitled "TUNABLE EMPTY PIPE FUNCTION", which is incorporated herein by reference in its entirety.

BACKGROUND OF THE INVENTION

The present invention relates to magnetic flowmeters used for measuring a fluid flow within a conduit, and more particularly to detection of low liquid conductivity or empty pipe conditions in magnetic flowmeters.

Generally, magnetic flowmeters measure a fluid flow rate by measuring a electric potential across two electrodes within the pipe segment, where the electric potential is induced within the flow by the presence of an electromagnetic field. The operating principle of the magnetic flowmeter is based on Faraday's Law of electromagnetic induction, which states that a voltage will be induced in a conductor moving through a magnetic field. The magnitude of the induced voltage is directly proportional to the velocity of the fluid flow, the width of the conductor, and the strength of the magnetic field.

Magnetic flowmeters may include circuitry and/or software for detecting empty pipe conditions. Unfortunately, under certain circumstances, empty pipe detection circuitry may still provide false indications of empty pipe conditions.

Therefore, there is an on-going need in the process industry for a magnetic flowmeter with improved empty pipe detection capabilities. Embodiments of the present invention provide solutions to these and other problems, and offer other advantages over the prior art.

SUMMARY OF THE INVENTION

An electromagnetic flowmeter for measuring a flow rate of a fluid in a pipe is described. A pipe carries a fluid. A magnetic coil is disposed adjacent to the pipe for inducing a magnetic flux in the fluid. A plurality of electrodes are disposed within the pipe, and the plurality of electrodes are electrically isolated from one another. Measurement circuitry is coupled to at least one of the plurality of electrodes and is configured to measure flow rate as a function of a potential across the plurality of electrodes. An empty pipe detector is coupled to at least one of the plurality of electrodes and is adapted to detect an empty pipe condition based upon an adjustable test criteria. In one embodiment, a local operator interface is coupled to the empty pipe detector for adjusting the adjustable test criteria.

While the above-identified illustrations set forth preferred embodiments, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

The present invention is a magnetic flowmeter that includes an adjustable empty pipe detector for manual adjustment (sometimes referred to as "tuning") of the empty pipe detector for a specific implementation and/or for a particular process fluid. Generally, the flowmeter is provided with a local operator interface for adjusting parameters associated with empty pipe conditions in order to "tune" or improve operation of the magnetic flowmeter preferably to eliminate false empty pipe indications.

Figure 1:
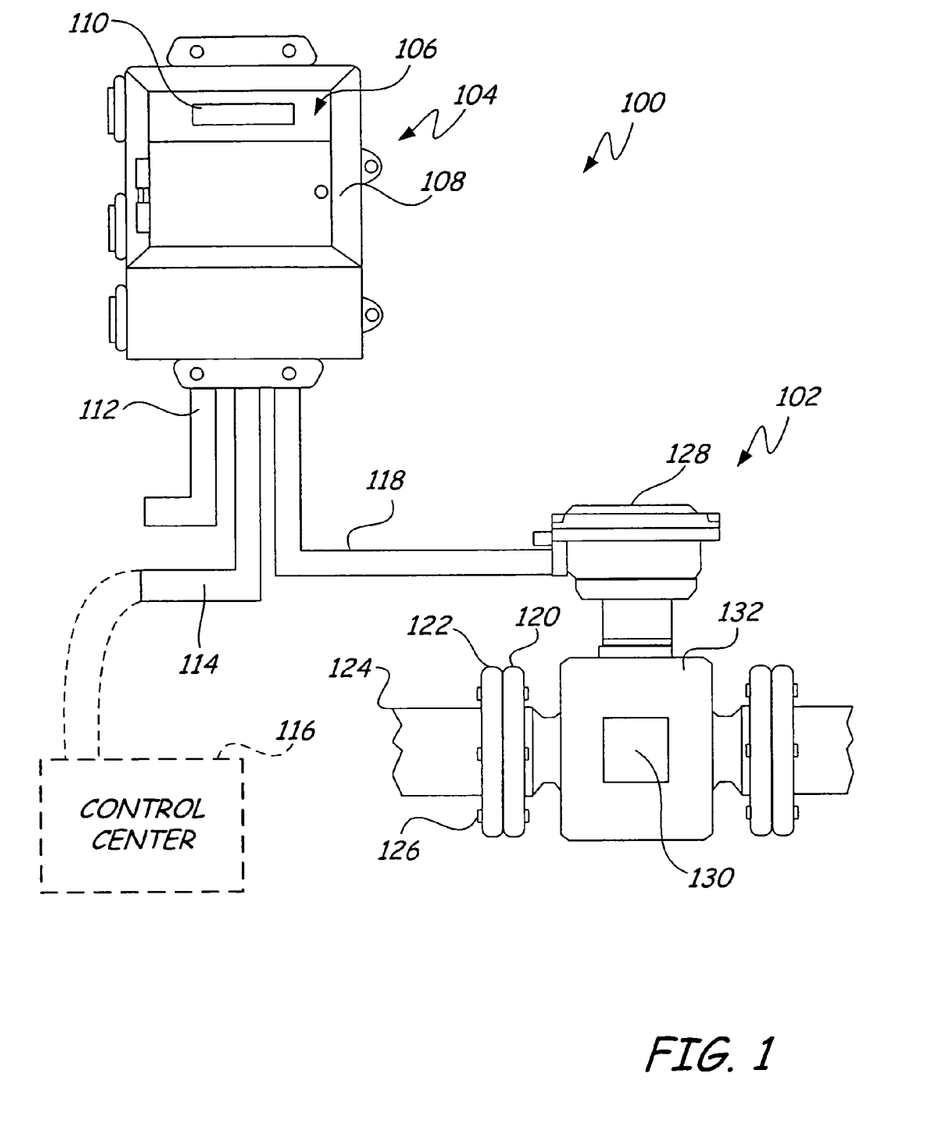
FIG. 1 illustrates a simplified diagram of a magnetic flowmeter system having a tunable empty pipe function according to an embodiment of the present invention.

FIG. 1 illustrates a simplified diagram of a magnetic flowmeter assembly 100 having a tunable empty pipe function according to an embodiment of the present invention. Magnetic flowmeter assembly 100 includes a magnetic flowmeter 102 and a transmitter 104 with a local user interface 106. The cover 108 of transmitter 104 is closed, so that the keypad portion of the local user interface 106 is hidden, but the display portion 110 remains visible.

The transmitter 104 includes a power conduit 112 and a signal conduit 114. The signal conduit 114 connects the transmitter 104 to a control center 116 for transmitting alarm signals, measurement data, and the like and for receiving control signals. In an alternative environment, the signal conduit 114 may be omitted, and communication between control center 116 and transmitter 104 can occur via a wireless connection. Process electronics are generally housed within the transmitter 104 and electrically coupled to the local user interface 106. In addition to circuitry for empty pipe detection (illustrated generally in FIG. 3), the process electronics may include a memory for storing raw flow measurement data, a microprocessor, and software (sometimes referred to as "firmware").

A flowmeter conduit 118 couples the transmitter 104 to the flowmeter 102. Electrical interconnects and magnetic coils (shown in FIGS. 2 and 3) are confined within the flowmeter 102 and are isolated from the environment and from the process.

Generally, the magnetic flowmeter 102 is coupled to pipe section 124 by flanges 120 and corresponding pipe flanges 122 using threaded fasteners 126. Though FIG. 1 illustrates a pipe section 124, which is a tube, the flowmeter 102 can be coupled to other types of fluid conveying structures as well. As used herein, the term "pipe" refers generally to any conduit for conveying fluid, including a tube, a channel, and the like.

Finally, access panel 128 is provided to allow an operator access to the electrical interconnections for coupling the transmitter 104 to the flowmeter 102 via conduit 118. Additionally, access panel 130 is provided to permit operator access to electrode wiring within the flowmeter body 132.

Figure 2:
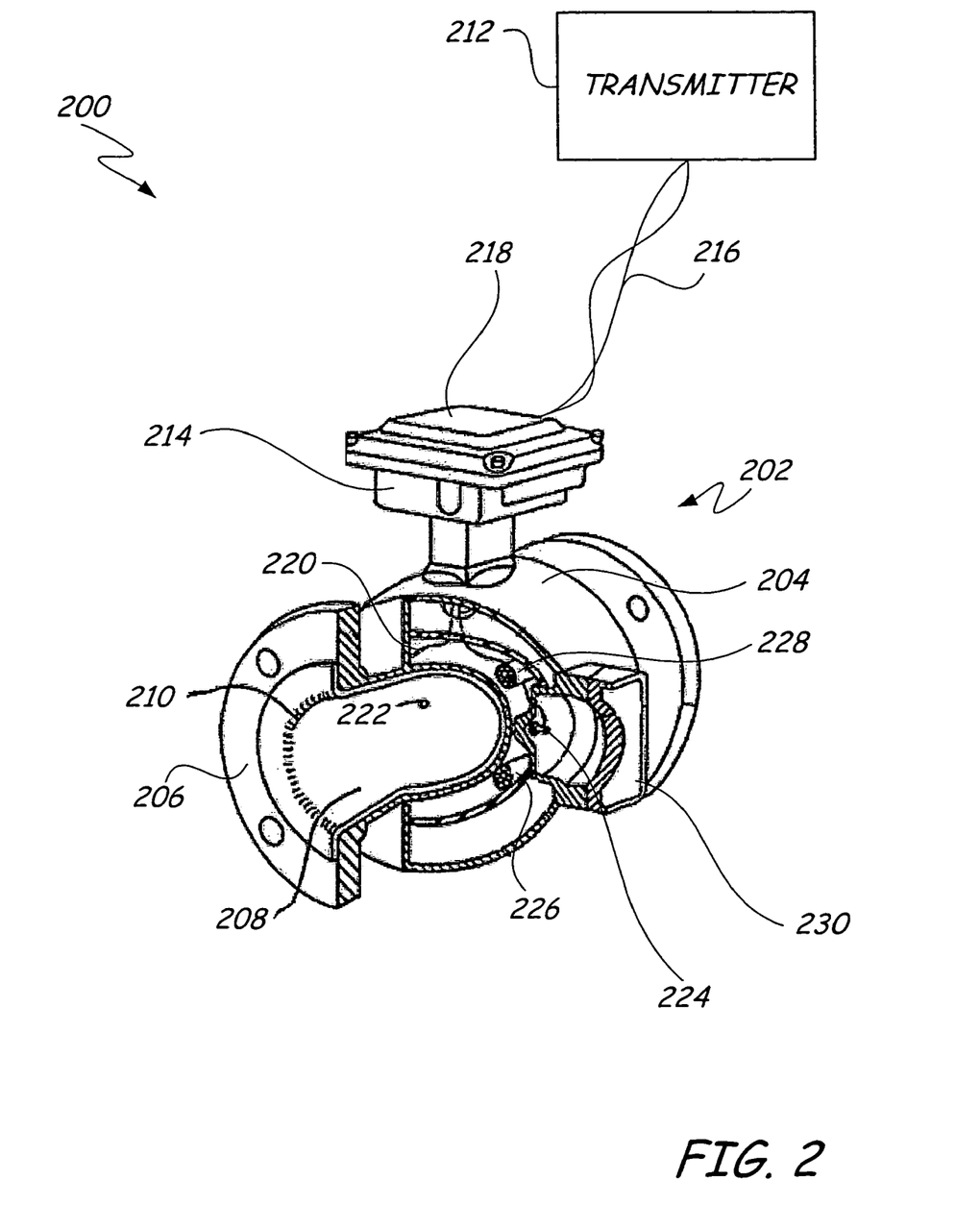
FIG. 2 illustrates a magnetic flowmeter flow pipe assembly according to an embodiment of the present invention.

FIG. 2 illustrates a magnetic flowmeter assembly 200 including a magnetic flowmeter 202 with a portion shown in cross-section. The magnetic flowmeter 202 includes a pipe section 204 with flanges 206 for coupling to a pipe or conduit of an industrial process. The pipe section 204 defines a passage 208 for fluid flow. Generally, the pipe section 204 is formed of a rigid material, such as nonmagnetic stainless steel for pressure containment, and may be lined with an electrically insulating liner 210, such as Teflon, polyurethane, Tefzel, other plastic resin, ceramic, or other types of electrically insulating materials. For lower pressure applications, pipe section 204 can be formed from electrically insulative material, in which case liner 210 may be omitted. Other designs of passages 208 can be used as well. For example, a metal pipe section can be used having only a partial insulating lining such as an insulating annulus about each electrode.

Additionally, though the flowmeter 202 is shown with flange elements 206, other connection means are possible. In an alternative embodiment, the pipe section 204 can be formed without flanges, and the flowmeter 202 can be clamped between flanges of mating pipes using extended bolts to cage the flowmeter 202.

In general, a transmitter 212 is coupled to electronics housing 214 of the flowmeter 202 via wiring 216. The electronics housing 214 is provided with a releasable cover 218 to allow operator access to an electrical distribution block and electrical connectors provided within the electronics housing 214.

Electrical leads 220 extend from within the electronics housing 214 into the pipe section 204 to connect to electrodes 222 and 224 and to magnetic coils 226 and 228. Finally, access panel 230 is provided to allow operator access to wiring within the pipe section 204.

The magnetic coils 226 and 228 are excited to generate a magnetic field, which induces a voltage in the process fluid flow within the pipe section 204. The electronics within the electronics housing 214 measures the voltage potential between the two electrodes 222 and 224, which can be used to determine a rate of flow. Specifically, the magnitude of the induced voltage (E) is directly proportional to the velocity of the conducting fluid (V), the conductor width (W), and the strength of the magnetic field (B) according to the following equation:

$$E = kBWV$$

Where the variable k represents a constant. The magnetic field coils 226 and 228 are generally positioned on opposing sides of the pipe section 204 to generate the field. As the conductive liquid moves through the field with average velocity (V), the electronics measures the voltage potential across electrodes 222 and 224. Alternatively, the electronics can be configured to measure a voltage potential relative to ground or relative to a process reference. In one embodiment, the process reference is a fixed potential.

Since the width (W) is the spacing between the electrodes and the magnetic field (B) is controlled by the magnetic coils 226 and 228, the only variable is the velocity (V) of the process fluid. The liner 210 (or an insulating element) prevents the voltage signal from shorting to the pipe wall. Thus, the output voltage (E) is directly proportional to the liquid velocity, resulting in an inherently linear output. This output voltage (E) may also be referred to as an "electromotive force" (EMF), a "flow signal", a "potential" or an "electrode voltage". It should be understood that electrodes 222 and 224 contact the fluid in the passage 208 (when liquid is present), and the fluid completes a circuit between the electrodes 222 and 224.

Generally, the process circuitry in transmitter 212 (or in a remote location) provides an improved liquid conduction indication. Transmitter 212 is provided with a releasable cover or lid, which can be opened or removed to expose a local operator interface. In the present invention, the user or operator can manually access adjustable empty pipe criteria and/or adjustment functions via the local operator interface of the transmitter 212 so that the empty pipe trigger can be adjusted to reduce or eliminate false empty pipe indications. Typically, such false indications occur when the fluid within the pipe is very conductive and moisture sticks to the walls of the pipe providing a lower than expected resistance between the electrodes 122,124 when the pipe is empty. In such an instance, the pipe section 204 may be substantially empty, but the magnetic flowmeter 202 can still give a false indication that there is fluid flow through the pipe section 204.

Figure 3:
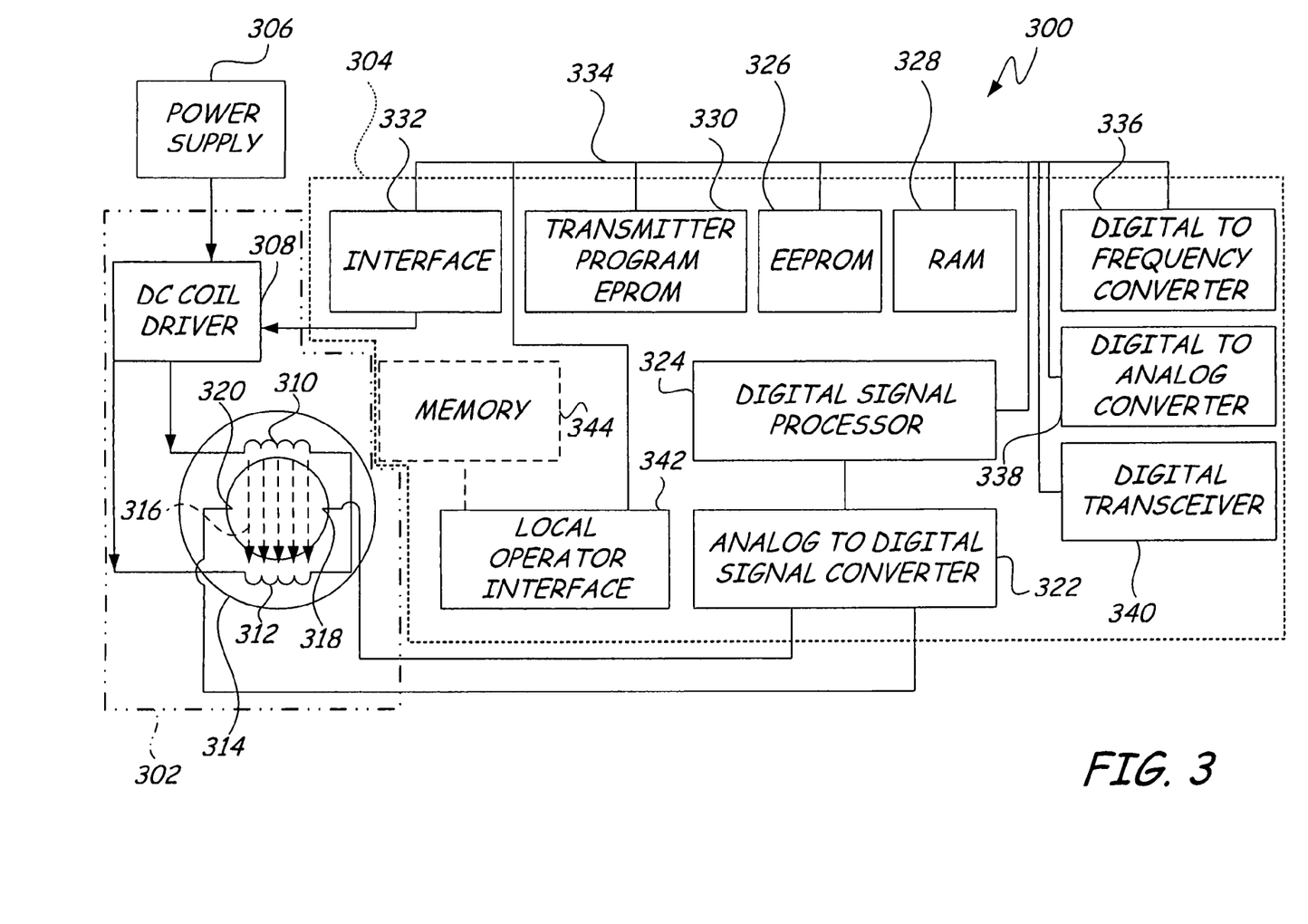
FIG. 3 is a simplified block diagram of illustrating functional elements of the transmitter and magnetic flowmeter according to an embodiment of the present invention.

FIG. 3 is a simplified block diagram of a magnetic flowmeter assembly 300 illustrating some of the functional elements of a transmitter according to an embodiment of the present invention. The assembly 300 includes a magnetic flowmeter 302, which is coupled to transmitter 304 via an electrical connection.

The magnetic flowmeter 302 receives power from a power supply 306 (such as the loop wiring or other power supply). The power received by the flowmeter 302 drives the DC coil driver 308, which powers the magnetic coils 310 and 312 disposed on opposing sides of the flow pipe 314 to generate a magnetic field 316 through the flow pipe 314. Electrodes 318 and 320 sense the induced voltage, which is processed by an analog to digital signal converter 322. This conversion allows for precise corrections and engineering unit conversion. Digital signal processor (DSP) 324 receives the converted digital signal from converter 322. The DSP 324 can perform various processing steps on the data and on the flowmeter 302, including diagnostics, signal processing, electronics and tube calibrations, and the like.

Configuration data for the assembly 300 is stored in nonvolatile electronically erasable programmable read only memory (EEPROM) 326 (or Ferroelectric RAM-FRAM). The EEPROM (or FRAM) 326, RAM 328, transmitter program EPROM 330 (which stores the transmitter firmware), and interface 332 are connected to the microprocessor 324 via bus 334. Depending on the specific implementation, the transmitter 304 may be adapted to produce various outputs, including a zero to 10,000 Hertz output signal from the digital to frequency converter 336, a four to twenty milliamp output signal from a digital to analog converter 338, or a hybrid of digital and analog signals using the digital transceiver 340, which can be coupled to the output of the digital to analog converter 338. Thus, the assembly 300 can be utilized with a standard FieldBus implementation.

A local operator interface (LOI) 342 generally includes a keypad and a liquid crystal display (LCD). The LOI 342 provides access to the EEPROM (or FRAM) 326 via bus 334 for configuring empty pipe test criteria and optionally to memory 334 for retrieving stored measurement values. In a preferred embodiment, the LOI 342 may be utilized by an operator in the field to access stored measurement values from memory 344, to process the stored measurement values against the test criteria from the EEPROM (or FRAM) 326 using the DSP 324, to test whether an adjusted empty pipe criteria works with real data. In an alternative embodiment, the DSP 324 can be a microprocessor with digital signal processing functionality.

Figure 4:
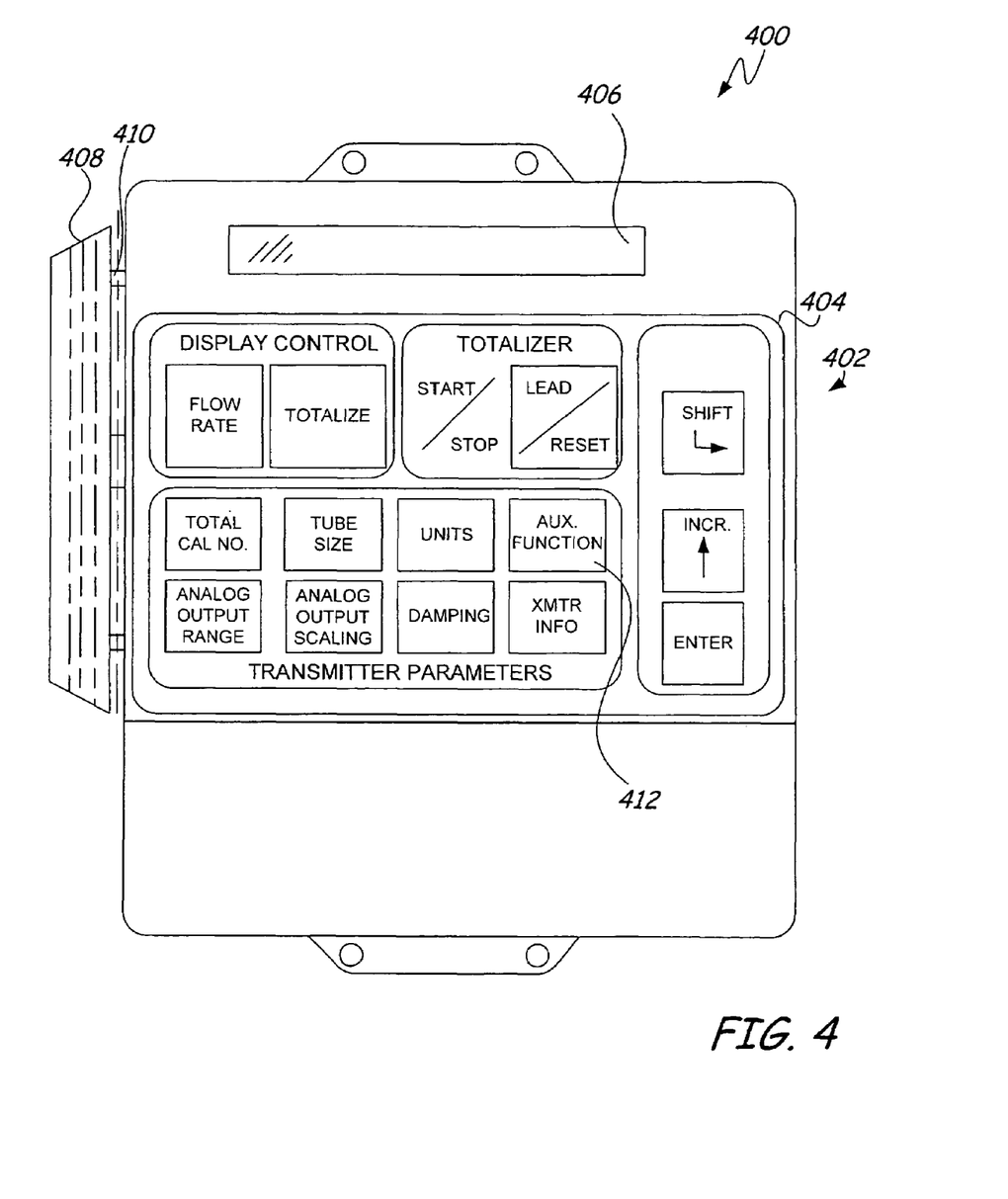
FIG. 4 is an expanded view of the transmitter of the magnetic flow transmitter with a local operator interface for adjusting empty pipe test criteria according to an embodiment of the present invention.

FIG. 4 illustrates a transmitter 400 with a local user interface 402, which includes a keypad 404 and a display 406. Cover 408 is coupled to the transmitter 400 via hinges 410 so that the cover 408 may be closed over the keypad 404 to protect the transmitter 400 from unintended operator interaction.

In general, the LOI 402 can be integral with the flowmeter (or it can be separate and connected via leads). The LOI 402 can be used to access any transmitter function necessary for setting up the transmitter 400. For example, the LOI 402 can be utilized to set up the flowmeter by entering the flow tube size. Moreover, the LOI 402 may be used to check totalized values, current settings, and the like. Additionally, the LOI 402 can be used to access the adjustable empty pipe functions, simply by selecting an appropriate menu item using keypad 402.

In one embodiment, the tunable empty pipe function is accessible as an auxilliary function via the LOI 402 using the auxiliary function key 412. The operator can adjust the empty pipe function settings using the shift and increment keys to navigate through menu options, to alter test criteria, and so on.

The LOI 402 provides a means whereby the operator can read the current empty pipe measurements or stored empty pipe measurements from a memory, and then adjust an empty pipe trigger level accordingly to match the unique application. Thus, if the process fluid sticks to the walls of the pipe section of the flowmeter, an operator can adjust manually the empty pipe function to detect the empty pipe. In one embodiment, the operator can adjust an empty pipe trigger level to be in the middle of a range of stored empty pipe measurements. Alternatively, the operator can view actual measurement data from when the pipe was full and when the pipe was empty, and choose an intermediate empty pipe trigger level. In an alternative embodiment, the LOI 402 can be used to automatically choose a trigger level based on the stored information. In an alternative embodiment, the LOI 402 can include expert systems, such as fuzzy logic systems, neural networks, artificial intelligence systems, or other systems adapted to detect empty pipe conditions and/or to automatically adjust the empty pipe function to accurately detect empty pipe conditions.

Additionally, the LOI 402 is adapted to provide statistics calculated from the stored empty pipe measurements. These statistics may include a minimum, a maximum, a mean, a median, a standard deviation, and other statistical analyses of the raw empty pipe measurements, which can then be displayed to an operator or provided to an expert system to adjust the empty pipe test criteria. Depending on the specific implementation, the statistics can be a commanded process or a background process that is always running, and can be taken over a fixed time period or on a user-defined time period.

The LOI 402 can be used to access and change a number of consecutive times the empty pipe reading must exceed the trigger level before registering an empty pipe. By increasing the number of consecutive times, noise issues and spurious empty pipe indications can be reduced or eliminated. If the process is clean or noise free, the number of consecutive counts can be set to a minimum (such as 1), to provide a faster empty pipe indication. If the process is noisy, the number of counts required to trigger the empty pipe indicator can be increased to ensure that the empty pipe value is valid before signaling an empty pipe condition.

Additionally, the LOI 402 allows the operator to set an empty pipe trigger level and a corresponding full pipe trigger level. For example, the operator can set an empty pipe trigger level at an intermediate value between empty pipe conditions and full pipe conditions (based on actual measurements shown on the display of the LOI 402). The operator can also set a full pipe trigger level at a different level (or a number of consecutive full-pipe readings to trigger a full-pipe indication). By setting both an empty and a full pipe trigger, the empty pipe detector continues to measure an empty pipe condition until the full pipe condition is exceeded, thereby preventing false full-pipe indications as well.

Additionally, a test function may be provided via LOI 402 for testing the new empty pipe settings (trigger level, counts, and the like), for example, on raw empty pipe measurements stored in a memory. In one embodiment, the transmitter can be triggered (via a menu option on the LOI 402) to store 10 minutes of raw empty pipe measurements. The LOI 402 can then prompt the operator about whether the pipe section was full or empty. The DSP or a microprocessor of the transmitter could then test the raw empty pipe measurements using an empty pipe algorithm with the adjusted settings. Every output of the algorithm is compared against the expected results (full or empty). In one embodiment, the test returns a simple pass/fail. In another embodiment, the test returns a result indicating the percentage of time the pipe was empty and full. The operator can then adjust the settings if necessary and retest.

Transmitter 400 can display actual measured empty pipe values on display 406. The transmitter 400 is adapted to display measurement values from when the pipe section is full and when the pipe section is empty. The user or operator in the field can then manually adjust the adjustable test criteria (such as, for example, an empty pipe trigger level) to an intermediate value between the full measurement value and the empty measurement value. The measurement value can be, for example, a voltage potential, a current, a resistance, an impedance, a capacitance, and the like. Alternatively, the measurement value can be, for example, signal attenuation, a change in a transient response of the system, and so on.

By testing the settings against stored raw data, adjustments can be tested over a relatively large data set in seconds. By testing against long periods, spurious noise events can be reduced or eliminated. If the noise was spurious, the operator might miss it as he or she tries makes the adjustment by looking at the raw data. Additionally, an operator may miss an empty pipe condition that is seen for only a few seconds. In one embodiment, the memory stores multiple sets of data related to empty pipe events. In general, the test routine can evaluate and test a portion of the data or multiple sets of the data, and the amount of data available to be tested is limited only by the amount of memory available for storing the raw data.

Figure 5:
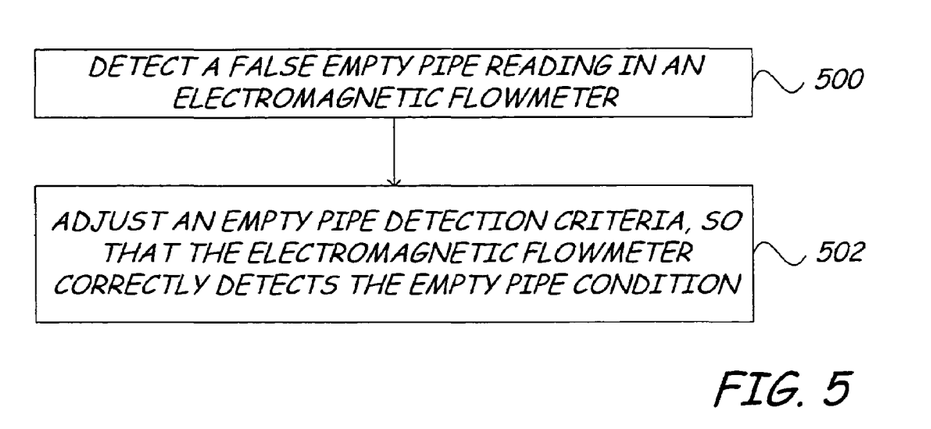
FIG. 5 is a simplified flow diagram of a method of adjusting an empty pipe detector of a magnetic flowmeter according to an embodiment of the present invention.

FIG. 5 is a simplified flow diagram of the method of tuning a magnetic flowmeter to a particular implementation according to an embodiment of the present invention. A false empty pipe reading is detected in an electromagnetic flowmeter (block 500). The empty pipe detection criteria is then adjusted so that the flowmeter correctly detects the empty pipe condition (block 502). Depending on the implementation, the adjustment of the empty pipe detection criteria is made using a local operator interface, is made automatically via expert system, or is made using a control signal from a control center or from a hand held device in the field.

Figure 6:
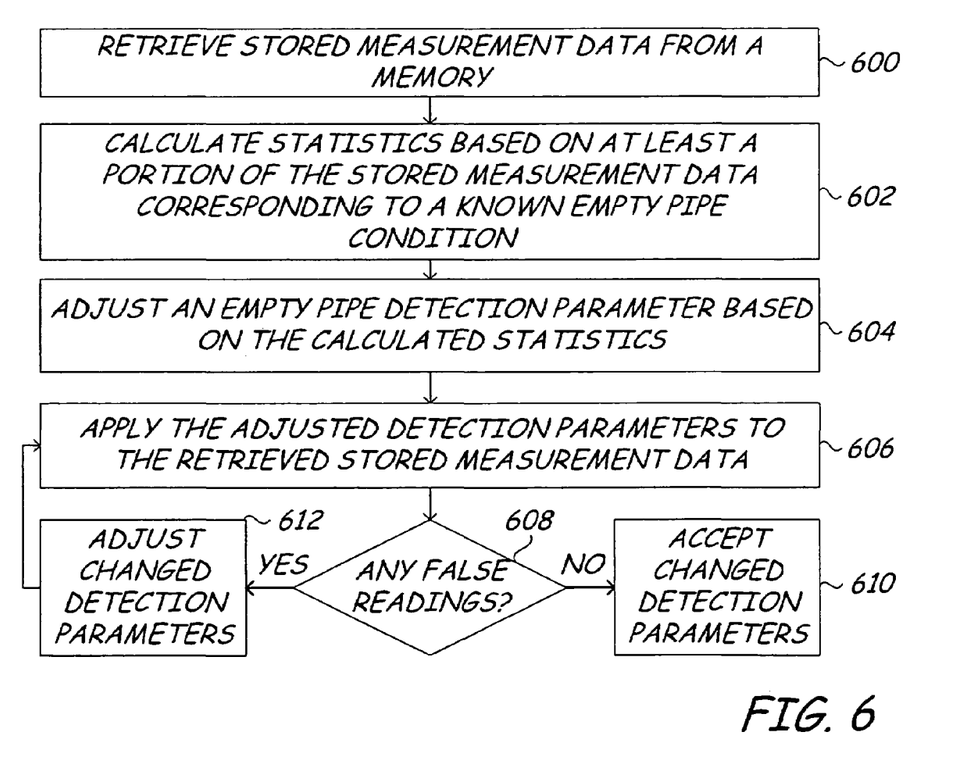
FIG. 6 is a simplified flow diagram of a method of adjusting an empty pipe detector of a magnetic flowmeter based on stored measurement data according to an embodiment of the present invention.

FIG. 6 is a simplified flow diagram of a method of adjusting the empty pipe criteria according to an embodiment of the present invention. Stored measurement data is retrieved from a memory (block 600). The memory may be located within the transmitter or may be a remote data store, such as a database in the control center.

The transmitter calculates statistics based on at least a portion of the stored measurement data preferably corresponding to a known empty pipe condition (block 602). The empty pipe detection criteria is adjusted based on the calculated statistics (block 604). The adjusted detection criteria are then tested against the retrieved measurement data to verify that the adjusted criteria are correct (block 606). If the tested criteria produces no false readings (block 608), then the empty pipe detection criteria are accepted (block 610). If the tested criteria produces false readings (block 608), then the detection criteria are adjusted (block 612) and the adjusted criteria are re-tested (block 606).

Figure 7:
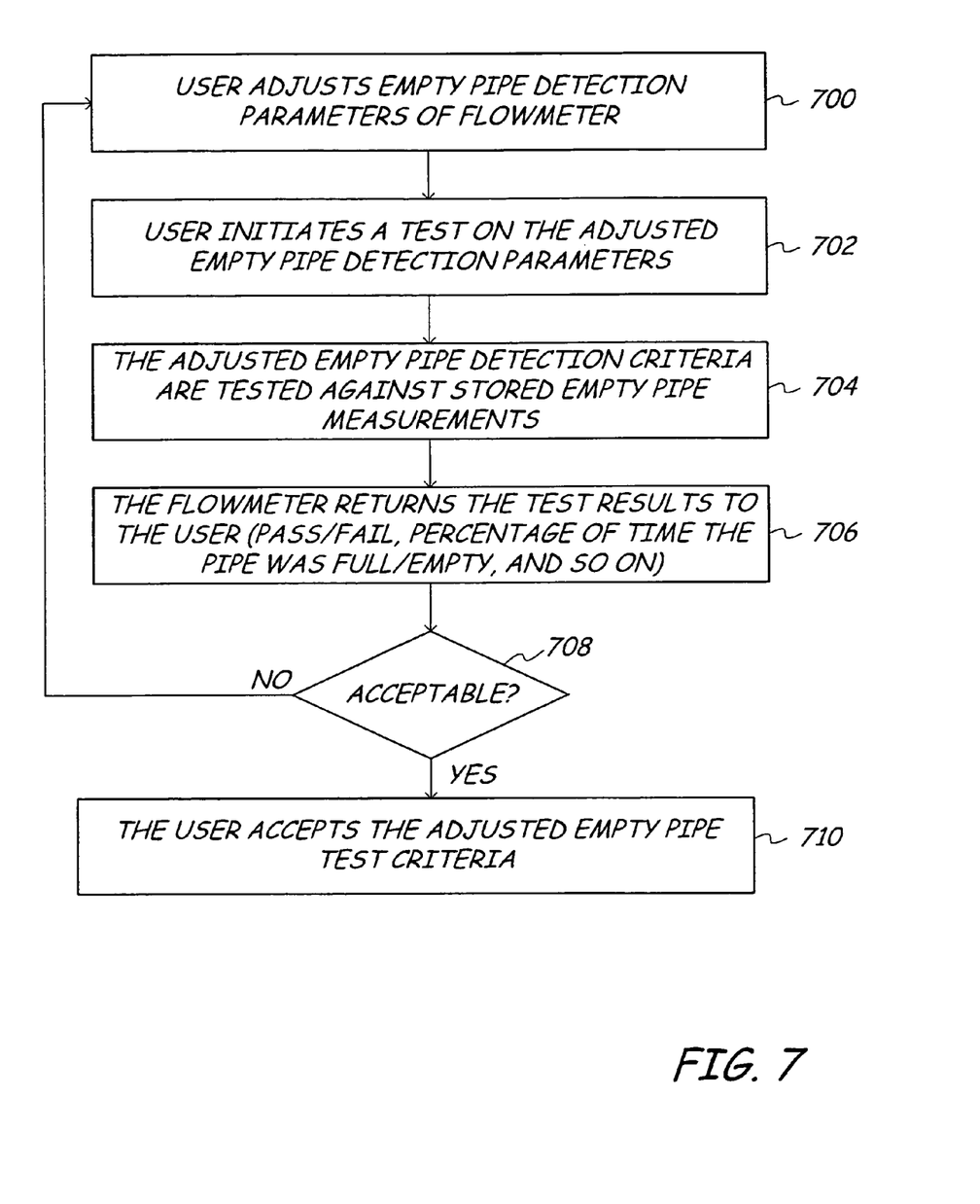
FIG. 7 is a simplified flow diagram of a method of adjusting an empty pipe test criteria feature according to an embodiment of the present invention.

FIG. 7 is a simplified flow diagram of a method of testing the adjusted empty pipe detection criteria. The user adjusts the empty pipe detection criteria of the magnetic flowmeter (block 700). The user initiates a test on the adjusted empty pipe detection criteria (block 702). The adjusted empty pipe detection criteria are tested against stored empty pipe measurements (block 704). The transmitter displays the test results to the user (pass/fail, percentage of time the pipe was full/empty, and so on) (block 706). If the test results are unacceptable (block 708), then the user repeats steps 700–706. If the test results are acceptable, the user accepts the adjusted empty pipe test criteria (block 710).

Figure 8:
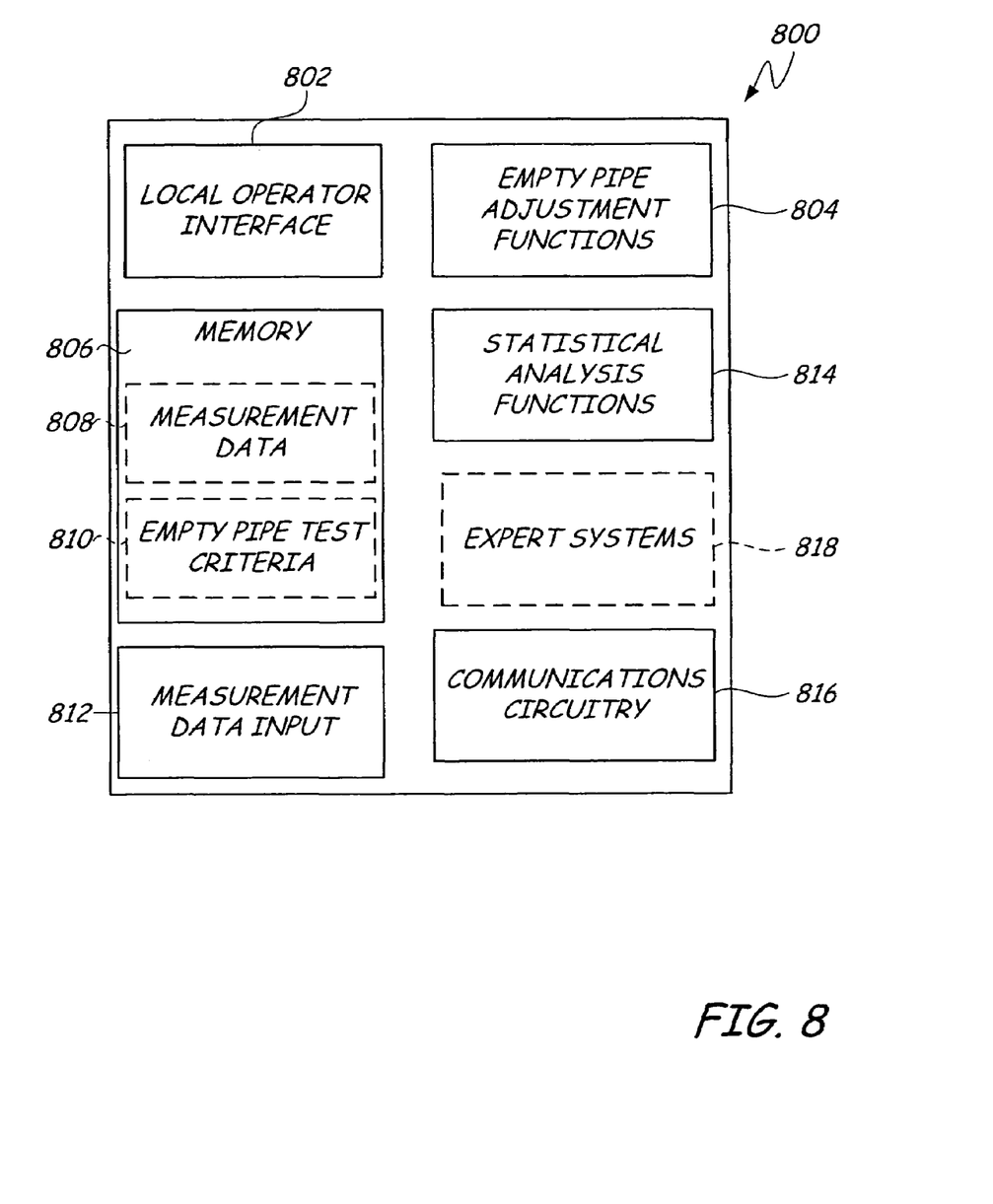
FIG. 8 is a simplified block diagram of functional elements of the empty pipe test criteria adjustment feature according to an embodiment of the present invention.

FIG. 8 is a simplified block diagram illustrating functional elements of the empty pipe detection criteria adjustment feature 800 according to an embodiment of the present invention. The feature 800 includes a Local Operator Interface (LOI) 802 having a display and an input means, which may include a port sized to receive a plug from an input device, a keyboard, a pen-based input device, a hand-held device, or any other input mechanism. The LOI 802 provides operator access to empty pipe adjustment functions 804, which includes trigger level criteria, count triggers, and the like.

The feature 800 includes memory 806, which is adapted to store measurement data 808 and empty pipe measurement criteria 810. In an alternative embodiment, the measurement criteria is stored in an EEPROM, FRAM or EPROM of the transmitter. A measurement data input 812 is a communication block adapted to receive measurement values from the flowmeter. Alternatively, the measurement values may be converted to digital measurements before they are received by measurement data input 812.

The feature 800 includes statistical analysis functions and algorithms 814, which can be used by the microprocessor of the transmitter to analyze the stored measurement data 806 to assist the operator in selecting an appropriate empty pipe trigger. Communications circuitry 816 is a transceiver adapted to generate and to transmit an alarm signal to a display or to a control center if the empty pipe test criteria is triggered.

In one embodiment, the feature 800 may include expert systems 818, such as artificial intelligence, neural networks, fuzzy logic, and various other mechanisms or agents adapted to monitor and analyze the data programmatically. Expert systems may provide recommendations regarding trigger levels and test criteria settings to a user based on data derived from the statistical analysis algorithms and functions (block 814). In an alternative embodiment, the expert systems 818 dynamically and programmatically tune the performance of the transmitter with respect to flowmeter measurements by automatically adjusting the criteria as needed to match process conditions. In such an instance, control data from a control room may be required to provide feedback to the expert systems 818 with respect to what should be happening with the process being measured. For example, if the flow is shut off, the empty pipe measurement should correspond to such conditions, as compared to when the industrial process is progressing at full speed.

It should be understood by workers skilled in the art that the empty pipe detection criteria adjustment feature 800 can be functions within a microprocessor of an empty pipe transmitter. Alternatively, some of the functional elements of the adjustment feature 800 can be implemented in software or circuitry, depending on the specific implementation.

Figure 9:
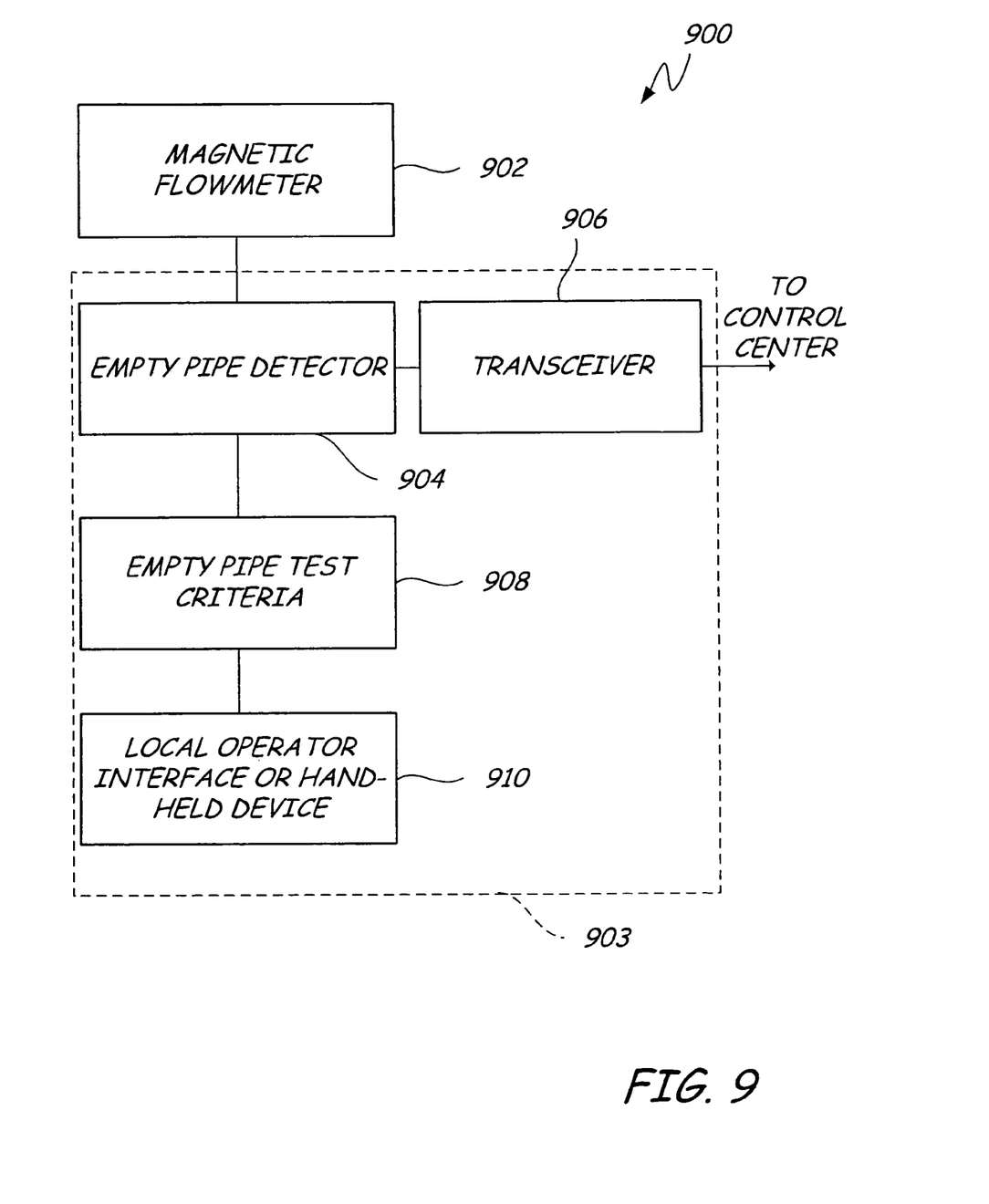
FIG. 9 is a simplified block diagram of a magnetic flowmeter with adjustable empty pipe detection criteria according to an embodiment of the present invention.

FIG. 9 is a simplified block diagram of a flowmeter assembly 900 according to an embodiment of the present invention. Assembly 900 includes magnetic flowmeter 902 coupled to transmitter 903. Transmitter 903 includes empty pipe detection circuitry 904 adapted to detect empty pipe conditions within the pipe segment of flowmeter 902. The empty pipe detection circuitry 904 is coupled to transceiver 906 for transmitting information (such as an alarm or other signals) to the control center or to receive control signals from the control center. Additionally, empty pipe test criteria 908 are stored within transmitter 903 and used by the empty pipe detection circuitry 904 to correctly detect empty pipe conditions. A LOI or a hand held device 910 is provided to allow an operator to access and to adjust the empty pipe test criteria 908 to tune the flowmeter assembly 900 to a specific installation.

Finally, while the present invention has largely been described with respect to a local operator interface, it should be understood that the present invention can be implemented with other types of operator interfaces, either in addition to or in place of the local operator interface described above. For example, the tunable magnetic flowmeter may be implemented with transmitter circuitry and/or software features that allow the adjustments to be made from a control center via the communications link or with a separate handheld device that interfaces with the empty pipe detector of the flowmeter.

Although the present invention has been described with reference to preferred embodiments, workers skilled in the art will recognize that changes may be made in form and detail without departing from the spirit and scope of the invention.

What is claimed is:

1. An electromagnetic flowmeter for measuring a flow rate of a fluid in a pipe, the flowmeter comprising:
   a pipe for carrying a fluid;
   a magnetic coil disposed adjacent to the pipe for inducing a magnetic flux in the fluid;

a plurality of electrodes disposed within the pipe, the electrodes being electrically isolated from one another;

measurement circuitry coupled to at least one of the plurality of electrodes and configured to measure flow rate as a function of a potential across the plurality of electrodes; and an empty pipe detector coupled to at least one of the plurality of electrodes and adapted to detect an empty pipe condition based upon an adjustable test criteria.

2. The electromagnetic flowmeter of claim 1 further comprising:

a local operator interface coupled to the empty pipe detector for adjusting the adjustable test criteria.

3. The electromagnetic flowmeter of claim 2 wherein the user interface comprises:

a transceiver adapted to receive adjustment signals from a control center.

4. The electromagnetic flowmeter of claim 2 wherein the local operator interface comprises:

a handheld device adapted to communicate with the empty pipe detector, the handheld device comprising a keypad adapted to receive a user input and a display screen for displaying process data and configuration options to a user.

5. The electromagnetic flowmeter of claim 1 wherein the adjustable test criteria comprises a voltage potential level.

6. The electromagnetic flowmeter of claim 1 wherein the adjustable test criteria comprises a current level.

7. The electromagnetic flowmeter of claim 1 wherein the adjustable test criteria comprises a resistance level.

8. The electromagnetic flowmeter of claim 1 wherein the adjustable test criteria comprises a capacitance level.

9. The electromagnetic flowmeter of claim 1 wherein the adjustable test criteria comprises an extent of signal attenuation.

10. The electromagnetic flowmeter of claim 1 wherein the adjustable test criteria comprises a trigger associated with a number of consecutive empty pipe measurements before an alarm condition is detected.

11. The electromagnetic flowmeter of claim 1 further comprising:

statistical analysis functions adapted to calculate statistics from measurement data corresponding to empty pipe conditions.

12. The electromagnetic flowmeter of claim 11 wherein the statistics are selected from a group consisting of a minimum, a maximum, a mean, a median, and a standard deviation.

13. The electromagnetic flowmeter of claim 1 further comprising:

drive circuitry coupled to the magnetic coil to energize the coil.

14. The electromagnetic flowmeter of claim 1 wherein the empty pipe detector is further adapted to detect an empty pipe condition based in part upon a potential of the plurality of electrodes relative to a fixed potential.

15. The electromagnetic flowmeter of claim 14 wherein the fixed potential comprises ground.

16. The electromagnetic flowmeter of claim 14 wherein the fixed potential comprises process reference.

17. An electromagnetic flowmeter assembly for measuring a flow rate of a fluid in a pipe, the flowmeter assembly comprising:

a magnetic flowmeter coupled to the pipe containing the fluid, the flowmeter comprising magnetic coils disposed on opposing sides of the pipe to generate a magnetic field substantially perpendicular to a direction of fluid flow and a plurality of electrodes disposed on opposing sides of the pipe and extending into the fluid flow, each of the plurality of electrodes being electrically isolated from one another; and measurement circuitry coupled to at least one of the plurality of electrodes and adapted to measure a flow rate as a function of a potential across the plurality of electrodes; and an empty pipe detector coupled to the measurement circuitry and adapted to detect an empty pipe condition based upon an adjustable test criteria.

18. The electromagnetic flowmeter of claim 17 wherein the adjustable test criteria comprises a voltage potential level.

19. The electromagnetic flowmeter of claim 17 wherein the adjustable test criteria comprises a current level.

20. The electromagnetic flowmeter of claim 17 wherein the adjustable test criteria comprises a resistance level.

21. The electromagnetic flowmeter of claim 17 wherein the adjustable test criteria comprises a capacitance level.

22. The electromagnetic flowmeter of claim 17 wherein the adjustable test criteria comprises an extent of signal attenuation.

23. The electromagnetic flowmeter of claim 17 wherein the adjustable test criteria comprises a trigger associated with a number of consecutive empty pipe measurements before an alarm condition is detected.

24. The electromagnetic flowmeter of claim 17 wherein the empty pipe detector is further adapted to detect an empty pipe condition based in part upon a potential of the plurality of electrodes relative to a fixed potential.

25. The electromagnetic flowmeter of claim 24 wherein the fixed potential comprises ground.

26. The electromagnetic flowmeter of claim 24 wherein the fixed potential comprises process reference.

27. The flowmeter assembly of claim 17 wherein the empty pipe detector comprises:

a local operator interface coupled to the empty pipe detector and adapted to allow an operator to adjust the adjustable test criteria.

28. The flowmeter assembly of claim 27 wherein the local operator interface comprises:

a display screen adapted to display measurement information and functional options to an operator; and a keypad adapted to receive operator input for selecting between functional options and for adjusting the adjustable test criteria.

29. The flowmeter assembly of claim 17 wherein the adjustable test criteria comprises an empty pipe trigger level.

30. The flowmeter assembly of claim 17 wherein the adjustable test criteria comprises a number of consecutive measurements in excess of an empty pipe trigger level to trigger an empty pipe reading and a number of consecutive measurements less than a full pipe trigger level to trigger a full pipe reading.

31. The flowmeter assembly of claim 17 wherein the transmitter further comprises:

a transceiver coupled to the measurement circuitry and adapted to send and receive signals to and from a control center.

32. A magnetic flowmeter assembly comprising:

a magnetic flowmeter adapted to induce a voltage within a fluid flowing within a pipe with a magnetic field and to measure a flow rate of the fluid based on the induced voltage potential between electrodes disposed within the pipe;

an empty pipe detector coupled to the flowmeter and adapted to detect empty pipe conditions based on the induced voltage potential and one or more adjustable test criteria; and an adjustment interface coupled to the empty pipe detector for adjusting the one or more adjustable test criteria based on measurement data of an empty pipe condition.

33. The flowmeter assembly of claim 32 wherein the adjustment interface comprises:

statistical analysis functions adapted to calculate statistics from stored measurement data associated with empty pipe conditions over a period of time.

34. The flowmeter assembly of claim 33 wherein the statistics are selected from a group consisting of a minimum, a maximum, a mean, a median, and a standard deviation corresponding to indications of empty pipe conditions.

35. The flowmeter assembly of claim 33 wherein the period of time is operator specified.

36. The flowmeter assembly of claim 32 wherein the one or more test criteria comprises an empty pipe trigger level.

37. The flowmeter assembly of claim 32 wherein the one or more test criteria comprises:

a consecutive trigger setting indicating a number of consecutive measurements with values above or below an empty pipe trigger level required to signal an empty pipe condition.

38. The flowmeter assembly of claim 37 wherein the adjustable test criteria comprises a voltage potential level.

39. The flowmeter assembly of claim 37 wherein the adjustable test criteria comprises a current level.

40. The flowmeter assembly of claim 37 wherein the adjustable test criteria comprises a resistance level.

41. The flowmeter assembly of claim 37 wherein the adjustable test criteria comprises a capacitance level.

42. The flowmeter assembly of claim 37 wherein the adjustable test criteria comprises an extent of signal attenuation.

43. The flowmeter assembly of claim 37 wherein the adjustable test criteria comprises a trigger associated with a number of consecutive empty pipe measurements before an alarm condition is detected.

44. The flowmeter assembly of claim 37 wherein the empty pipe detector is further adapted to detect an empty pipe condition based in part upon a potential of the plurality of electrodes relative to a fixed potential.

45. The flowmeter assembly of claim 44 wherein the fixed potential comprises ground.

46. The flowmeter assembly of claim 44 wherein the fixed potential comprises process reference.

* * * * *